Oct. 22, 1935.  H. A. HOLZER  2,017,970

DUMP TRAILER

Filed Aug. 13, 1931  2 Sheets-Sheet 1

INVENTOR.
Hiram A. Holzer
BY
ATTORNEY.

Oct. 22, 1935.   H. A. HOLZER   2,017,970
DUMP TRAILER
Filed Aug. 13, 1931   2 Sheets-Sheet 2
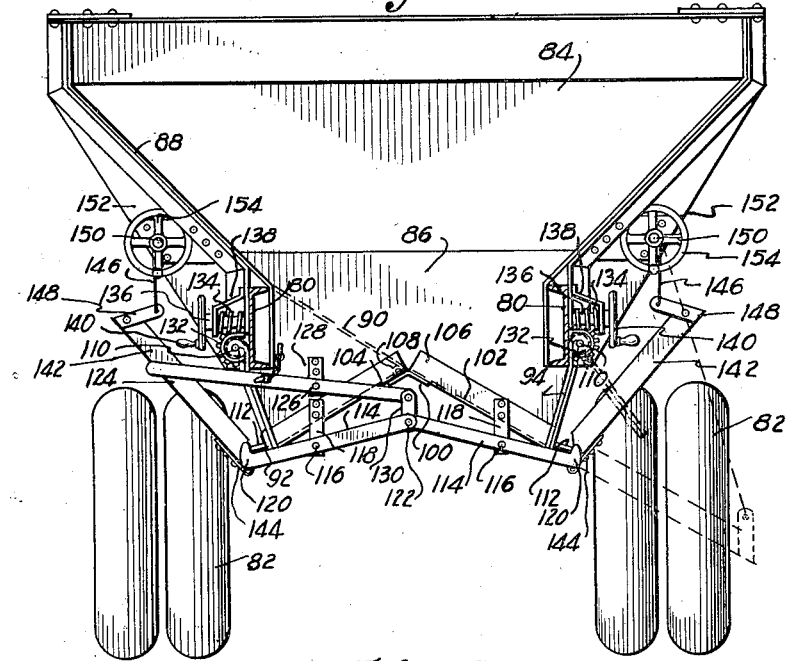
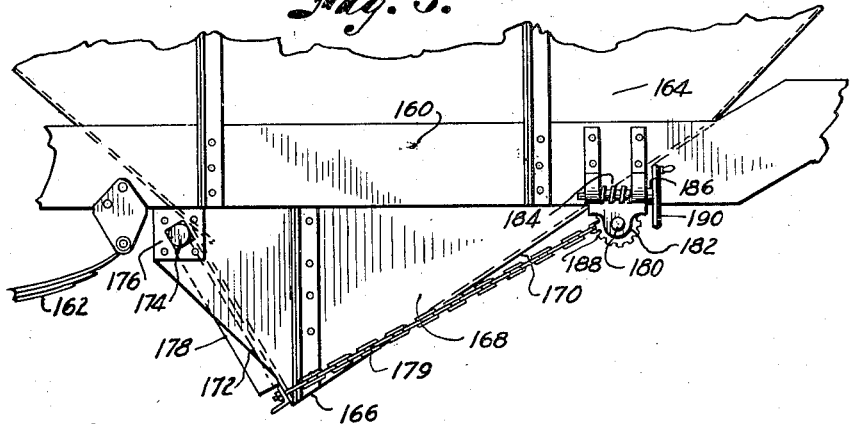
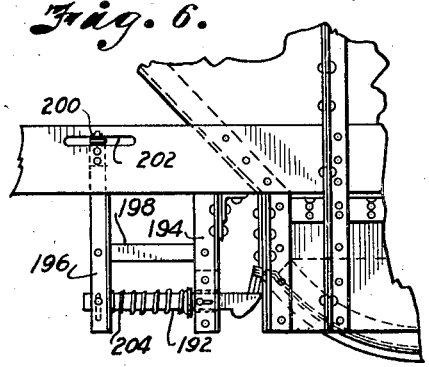
INVENTOR.
Hiram A. Holzer
BY
ATTORNEY.

Patented Oct. 22, 1935

2,017,970

UNITED STATES PATENT OFFICE 2,017,970

DUMP TRAILER

Hiram A. Holzer, Pittsburg, Kans., assignor to United Iron Works Company, Pittsburg, Kans., a corporation of Delaware Application August 13, 1931, Serial No. 556,733

1 Claim. (Cl. 298—30)

This invention relates to vehicles having dump bodies and more particularly to trailers having bodies provided with hinged doors operable to effect dumping of the load carried by the body.

The principal objects of this invention are to provide a bottom dump for material-conveying vehicles and to produce a dump trailer having bottom openings closed by hinged doors whereby a load carried by the trailer may be dumped beneath or closely adjacent the trailer.

Other objects of the invention will be apparent in the course of the following description of one form of apparatus embodying the invention and illustrated in the accompanying drawings, wherein:

Fig. 4 is a front end elevation of a modified form of bottom dump trailer, the forwardly projecting side sills being shown in section, one of the hinged bottom doors and chute related thereto, being shown by dotted lines in open position.

Fig. 5 is an enlarged fragmentary side elevation of a modified bottom portion of a dump trailer illustrating means for operating the door, the door and portions of the bottom being shown by dotted lines.

Fig. 6 is a fragmentary side elevation of the bottom portion of a dump body equipped with a door similar to that shown in Figs. 1 to 3, and illustrating a modified form of latch.

Figure 1:
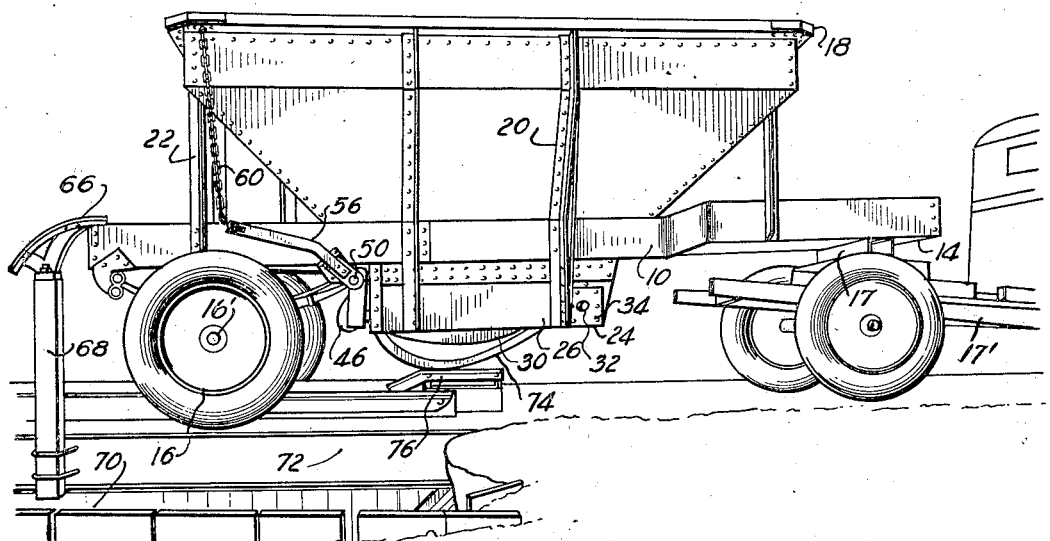
Fig. 1 is a perspective view of a dump trailer constructed in accordance with this invention, a traction vehicle and portions of a dump pit being shown fragmentarily.

Referring more in detail to the drawings:

10 and 12 designate the side sills and 14 the end sills of a trailer frame or chassis the rear end of which is mounted on wheels 16 rotatable on an axle 16' extending across and supporting the rear end of the frame. The front end is supported on a fifth wheel 17 of any conventional design, which is carried on a traction vehicle 17'. 18 designates a dump body mounted on the frame for containing material to be transported by the trailer.

The structure illustrated is adapted to transport a large quantity of heavy material and the body is reinforced and stabilized by angles such as 20 and 22 fixed to the body and the frame.

The body tapers downwardly and includes an open bottom portion 24 depending below the frame, and stiffened by downward continuations of the angles 20. The bottom portion includes side walls 26 having lower edges spaced substantially below the lower edges of the sills but spaced sufficiently above the ground over which the trailer is moved to prevent encounter of the depending body portion with obstacles on the ground.

End walls 28 of the bottom portion have lower edges spaced upwardly from the lower edges of the side walls 26 to accommodate an arcuate metal bottom door member 30 hingedly supported by the trailer to close the bottom opening of the body as presently described.

The front transverse edge of the door is provided with a hinge pin 32 having opposite ends mounted in portions of the side walls 26 reinforced by plates 34 as clearly shown in the drawings and may thus swing vertically to and from the bottom opening of the body.

Figure 2:
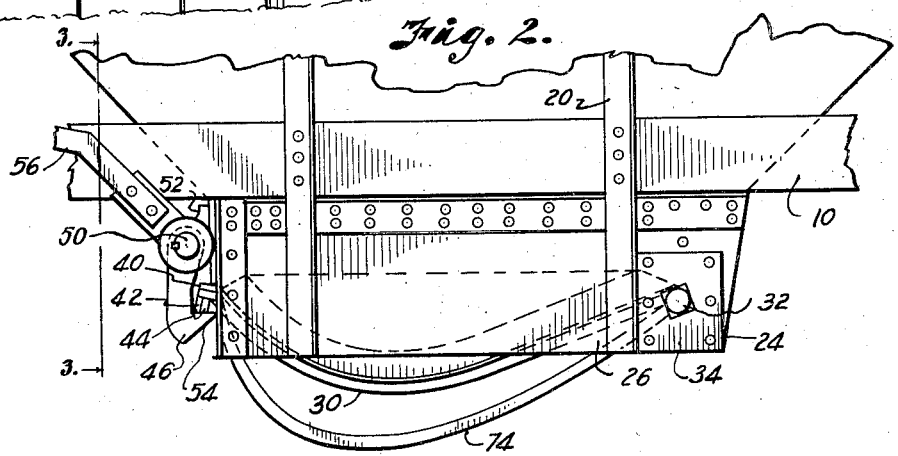
Fig. 2 is an enlarged side elevation of a portion of the trailer including the bottom of the dump body, the bottom door of the body and a door-closing loop being shown partly by dotted lines.

The door curves longitudinally sufficiently to cause the central portion thereof to extend below the lower edges of the side walls 26 as shown in Figs. 1 and 2, and has a rear end edge adapted to abut the upwardly offset lower edge of the rear end wall of the bottom portion while said portion extends below the side walls 26.

Figure 3:
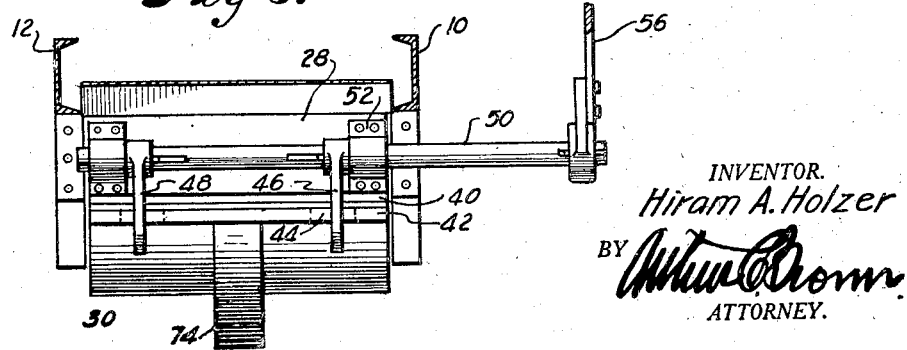
Fig. 3 is a vertical section of the trailer on the line 3—3, Fig. 2, giving an end elevation of the bottom portion of the dump body, a latch-operating lever and lever supporting chain being shown fragmentarily.

The rear edge of the door is reinforced by strips 40 and provided with a bar 42 arranged transversely along the rearwardly extending bottom edge portions of the reinforcing strips, and with stiffening blocks 44 fixed to the bar in spaced relation as shown in Fig. 3. The blocks form reinforced sections of the bar for engagement by latching members 46 and 48 mounted on a rod 50 rotatable in bearing brackets 52 fixed to the rear end wall of the depending body portion.

The latching members have noses 54 engageable with the lower faces of the bar and reinforcing blocks to support the free end of the door in bottom closing position and are operable by a lever arm or crank handle 56 fixed to the outwardly extending end of the rod 50 for moving the latching noses into and out of door supporting position. The lever arm 56 extends rearwardly from the rod 50 a substantial distance and has sufficient weight normally to cause the rod to pivot on its brackets and swing the latches into door supporting position.

A chain 60 connected with the outer end of the lever has an outer end connected with the body of the trailer adjacent the upper edge thereof for supporting the free end of the lever and limiting the forwardly swinging movement of the latches so that the beveled lower end faces of the latches are normally positioned in the path of the free edge of the door. Said free edge of the door may thus displace the latches to arrive at bottom-closing position and the latches will then swing by gravity into door supporting position.

A lateral arm 64 may be formed on the free end of the lever to ride up over an arcuate plate or releasing member 66 mounted on a post 68 at one side of a pit 70 provided with rails 72 forming a track for the trailer whereby the lever will be operated in a direction to swing the latches for releasing the door to dump the load into the pit.

The open door will swing between the rails, and in order to close the door, a curved projection preferably comprising a channel-like bar 74 has ends fixed to the ends of the door and depends below the trailer to engage and slide over a cam 76 mounted between the rails. The curved advance edge of the bar will encounter the downwardly inclined rear end portion of the cam, and slide thereover, thus lifting the rear end of the door and causing the rear edge thereof to displace the latches and move to closed position. The latches then swing into position to hold the door closed.

In Fig. 4 a modified form of dump trailer is shown, including longitudinal side sills or channels 80 supported by wheels 82, and a body including end walls each having an upper section 84 inclined downwardly inwardly, and a lower vertical section 86, and downwardly inwardly inclined side walls 88 secured to the side sills.

The lower longitudinal edges of the side walls terminate at the upper inner edges of the sills but may be formed of plates continued vertically downwardly to close the inwardly directed channels in the sills.

The lower edges of the side walls are thus spaced to provide the bottom opening for the body, and the opening is closed by a flap 90 and hinged doors 92 and 94 as presently described.

Side edge portions of the end wall sections 86 incline inwardly downwardly from the sills, and the lower edges of the sections are incut to provide upwardly converging bottom edges meeting in the longitudinal center line of the trailer and substantially in the plane of the lower edges of the sills.

Extending longitudinally beneath the body is a beam 100 comprising an angle iron having ends seated in the angles formed by the converging lower edges of the end wall sections 86 and fixed to said end walls.

Supplemental bottom plates or chutes 102 and 104 having front end edges shown in dotted lines in Fig. 4 have upper ends resting on the diverging faces of the angle beam 100 and extend substantially in registry with the inclined lower edges of the end walls. The dotted lines to which the numerals 102 and 104 are applied therefore indicate the contour of the lower edge of the front end wall section 86.

The opposite ends of the beam extend beyond the end walls 86 and support the upper ends of angle brackets 106 having vertical flanges overlying the outer faces of the end walls and horizontal flanges extending beneath the lower edges of the end walls to assist in supporting the supplementary bottom plates 102 and 104. The plates are preferably welded to the beam and end walls to form a rigid structure.

The flap 90 has an inner edge rolled to surround a hinge pin 108 suitably supported, for example, by the end walls of the body. The flap is sufficiently wide so that its outer edge portion may overlie and be supported by the lower edge portion of one or the other of the inclined side walls as shown at the left in Fig. 4, and lie in alignment with the supplementary bottom plate on the opposite side of the center beam.

The lower edges of the plates 102 and 104 are spaced below the lower edges of the sills and define downwardly laterally directed openings located substantially inwardly from the side walls of the body and from the wheels. The doors 92 and 94 are provided to close said openings, and are operable as presently described.

Each of the doors 92 and 94 has an upper edge pivotally mounted on a hinge pin 110 rotatably supported in strap hinges or the like fixed to the side sills, and a lower edge portion engageable with the outer edge of the adjacent plate 102 or 104, and provided with an exterior stiffening strip 112.

Latching fingers 114 substantially centrally pivotally supported by pins 116 projecting from straps 118 fixed to the brackets 106, have upwardly projecting latching teeth 120 to engage the strips 112 and latch the doors in closed position.

The inner ends of the latching fingers are pivotally connected by a pin 122 in the longitudinal center of the trailer, and a lever 124 pivotally supported by a pin 126 in a plate 128 fixed to the front end wall section 86 is connected with the pivot pin 122 by a link 130 for coincidently operating the latching fingers.

Worm gears 132 are further provided on the rolled edges of the doors, and worms 134 on shafts 136 supported by brackets 138 and meshed with the gears are operable by wheels 140 for swinging the doors to and from closed position.

Chute members or wings 142 are further provided to form extensions of the bottom plates 102 and 104, having inner edges connected to said plates by exterior strap hinges 144. Suitable lines 146 such as wires connected with ears 148 on the outer edges of the wings lead over pulleys or shafts 150 mounted on brackets 152 supported by the body, and operable by wheels 154 for lifting the wings.

The flap may be arranged to close the bottom portion at the left in Fig. 4, and form an inclined bottom having an outlet at the right of the figure closed by the door 94. The chute-like wing at the right may be lowered into alignment with the inclined bottom, and the outer end of the lever may be depressed to lift the upwardly converging latch fingers and release the latch tooth from the door 94, and material in the body will tend to press the door open for dumping the load.

The door may be controlled by the worm gear device for adjusting the area of the opening.

Fig. 5 illustrates another modified form of dump trailer including side sills 160 supported by springs 162 on running gear (not shown) and a body including a side wall 164 having a bottom portion 166 extending below the adjacent side sill. The side walls 168 of the bottom portion have front and rear edges converging downwardly, and a rearwardly inclined bottom wall 170 is mounted at the front edges of the walls. The rear end of the bottom portion is open and has downwardly forwardly inclined side edges forming a downwardly rearwardly directed discharge mouth beneath the body.

A door 172 having an upper edge provided with a hinge pin 174 mounted in brackets 176 fixed to the sills and side walls of the bottom portion 166, may swing to and from the opening. Wings 178 on the side walls further support the brackets 176 and provide a guide or housing for the door.

A chain 179 having one end fixed to the free edge of the door is connected with a shaft 180 rotatable in a bracket 182 supported by the adjacent sill, and a worm 184 on a shaft 186 supported by the bracket is meshed with a gear 188 on the shaft. The worm shaft may be rotated by a wheel 190 for operating the chain to release the door and to close and hold the door.

A modified form of latch is shown in Fig. 6 applicable to the doors illustrated in Figs. 1 to 3, including a body 192 slidable in an opening in a hanging bracket 194 fixed to one of the sills, into and out of door latching position. A second bracket 196 is substantially centrally pivoted to the outer end of a rigid bar 198 projecting from the bracket 194 and has a lower end pivoted to the outer end of the latch body 192 to form a latch operating lever. An operating arm 200 projects laterally from the upper end of the lever through a guide slot 202 in the sill, and a spring 204 on the latch body tends to move the body into door latching position.

In using the invention, a trailer body is provided having a bottom opening that may be closed by a hinged door, in accordance with the forms shown in any one of the several figures. The door may be held closed by any suitable means, and preferably by detaining means shown, to retain a load, and when allowed to swing open will effect dumping of the load beneath the body and between the wheels of the trailer.

Hinged wings may be provided in any form of the device for distributing material, and are particularly applicable to a body having a sharply inclined bottom wall as shown in Figs. 1 and 5, against which the free edge of the door may lie to retain material. For example, the bottom portion of the dump body may be arranged to form a laterally directed bottom outlet, and wings may be provided as shown in Fig. 4 for distributing the load laterally at one side of the trailer and exteriorly to the track of the wheels.

What I claim and desire to secure by Letters Patent is:

A dump vehicle including a frame, a body on the frame having a bottom dump opening, a door hinged at one end to the body for closing the opening, a shaft rotatably mounted on the body in parallel relation to and adjacent the free end of the door, a latching member fixed on said shaft for latching engagement with the free end of the door, a lever fixed to the shaft and normally tending to rotate the shaft by weight of the lever to urge said latching member to engagement with the door, and a flexible member connected to the body and the lever for holding said latching member in the path of said free end of the door whereby the door, when moving to closed position, can displace the latching member and be again engaged by said member when fully closed.

HIRAM A. HOLZER.